United States Patent [19]

Stone, III et al.

[11] Patent Number: 5,630,174

[45] Date of Patent: May 13, 1997

[54] ADAPTER FOR DETECTING WHETHER A PERIPHERAL IS STANDARD OR MULTIMEDIA TYPE FORMAT AND SELECTIVELY SWITCHING THE PERIPHERAL TO COUPLE OR BYPASS THE SYSTEM BUS

[75] Inventors: John E. Stone, III, Austin, Tex.; Stephen A. Smith, Palo Alto, Calif.

[73] Assignee: Cirrus Logic, Inc., Fremont, Calif.

[21] Appl. No.: 383,582

[22] Filed: Feb. 3, 1995

[51] Int. Cl.$^6$ .................... G06F 13/00; G06F 13/14
[52] U.S. Cl. .................... 395/883; 395/828; 395/830; 395/834; 395/836; 395/851; 395/858; 395/520
[58] Field of Search .................... 235/152; 358/22; 345/115, 132; 395/293, 200.12, 162, 154, 325, 838, 828, 830, 834, 836, 851, 858, 520

[56] References Cited

U.S. PATENT DOCUMENTS

| | | | |
|---|---|---|---|
| 4,855,813 | 8/1989 | Russell et al. | 358/22 |
| 5,335,321 | 8/1994 | Harney et al. | 395/162 |
| 5,392,407 | 2/1995 | Heil et al. | 395/325 |
| 5,396,602 | 3/1995 | Amini et al. | 395/293 |
| 5,402,147 | 3/1995 | Chen et al. | 345/115 |
| 5,428,730 | 6/1995 | Baker et al. | 395/154 |
| 5,467,452 | 11/1995 | Blum et al. | 395/200.12 |
| 5,473,342 | 12/1995 | Tse et al. | 345/132 |

Primary Examiner—Thomas C. Lee
Assistant Examiner—Le Hien Luu
Attorney, Agent, or Firm—Jonathan O. Owen; Robert P. Bell; J. P. Violette

[57] ABSTRACT

A computer system including one or more PCMCIA expansion slots allows video and/or audio capabilities to be added to the system through a standard PCMCIA interface, utilizing multimedia type PCMCIA peripheral cards. A PCMCIA host adapter integrated circuit interrogates a PCMCIA peripheral card to determine whether or not the PCMCIA peripheral card is a multimedia type PCMCIA peripheral including video or audio capability. If the PCMCIA peripheral card is a multimedia type peripheral, the PCMCIA host adapter integrated circuit couples the PCMCIA peripheral card directly to the graphics and sound controller integrated circuits, using the standard PCMCIA interface and bypassing the host system bus. Otherwise, if the PCMCIA peripheral card is a standard PCMCIA peripheral, then the PCMCIA host adapter integrated circuit interfaces communications between the PCMCIA peripheral card and the host system bus in a conventional manner. The computer system includes a multi-windowing or display function whereby a typical computer applications program may be operating and displayed in a first window or display while the system simultaneously displays a playback or live video signal from a multimedia type peripheral card in a second window or display.

15 Claims, 5 Drawing Sheets

ADAPTER FOR DETECTING WHETHER A PERIPHERAL IS STANDARD OR MULTIMEDIA TYPE FORMAT AND SELECTIVELY SWITCHING THE PERIPHERAL TO COUPLE OR BYPASS THE SYSTEM BUS

FIELD OF THE INVENTION

The present invention relates to the field of multimedia control circuits for Personal Computer Memory Card International Association (PCMCIA) standard peripheral cards. More particularly, the present invention relates to the field of control circuits for controlling the operation of and communications between multimedia-type PCMCIA peripheral cards and other subsystems over a standard PCMCIA interface.

BACKGROUND OF THE INVENTION

The Personal Computer Memory Card International Association (PCMCIA) is a standard interface and specification to allow PCMCIA peripheral cards to vary the capabilities of a computer system or other electronic equipment. The PCMCIA peripheral cards consist of a connector that interfaces to a printed circuit board that is approximately the size of a credit card. A typical system of the prior art, including PCMCIA capability, is illustrated in FIG. 1. The main printed circuit board or motherboard 100 includes the central processing unit (CPU) 126 which controls the operations of the computer system and also the internal system memory 128. The CPU 126 is coupled to the system memory 128 and the other integrated circuits on the motherboard 100 by the core logic 124 and the system bus 140.

The PCMCIA Host Adapter integrated circuit 110 is coupled as the interface between the system bus 140 and the PCMCIA expansion slots 112 and 114 in order to control communications between the PCMCIA expansion slots 112 and 114 and the system bus 140. The PCMCIA Host Adapter integrated circuit 110 is coupled to the PCMCIA expansion slot 112 by the PCMCIA interface bus 120 and to the PCMCIA expansion slot 114 by the PCMCIA interface bus 122.

The PCMCIA host adapter integrated circuit 110 controls and directs communications between the peripherals coupled to the PCMCIA expansion slots 112 and 114 and the system bus 140.

The system bus 140 has a differing number of address and data lines as compared to the address and data line requirements of the PCMCIA interface busses 120 and 122. Data transfers across the system bus 140 are at a different rate than the data transfer to a PCMCIA card 116 or 118. Other control signals, not included on the system bus 140, are also required at the PCMCIA interface in order to adapt to the various needs of differing types of PCMCIA cards that may be inserted. Thus, the PCMCIA interface is very flexible and the PCMCIA host adapter integrated circuit 110 is used to interface differing data and address line requirements having different transfer rates between the system bus 140 and the PCMCIA cards 116 or 118.

The PCMCIA expansion slots 112 and 114 are two typical implementations of sockets, also referred to as slots, into which a PCMCIA card 116 or 118 can be inserted. The PCMCIA standard enables memory and input/output (I/O) devices to be inserted as exchangeable peripherals into electronic devices through a standard interface. A PCMCIA card 116 uses this standard interface, allowing PCMCIA interfaced peripheral devices such as a modem card, a network card, a sound card, a floppy disk drive, a hard disk drive, or other cards to be plugged into the system computer by means of their embodiment in a PCMCIA card 116. This PCMCIA card 116 is plugged into a PCMCIA expansion slot 112 which is coupled to a PCMCIA host adapter integrated circuit 110 within the computer system. The operation of the PCMCIA expansion slot 112 is controlled by the PCMCIA host adapter integrated circuit 110.

In a portable computer system, the graphics controller 134 is included on the motherboard 100. The graphics controller 134 is coupled to the system bus 140 and to the output display used by the portable computer system, by either of the outputs 136 or 138. If the output display used by the portable computer system is a CRT display then the RGB output 136 of the graphics controller 134 is coupled to the display. If the output display used by the portable computer system is a flat-panel display then the flat-panel output 138 of the graphics controller 134 is coupled to the display.

In the systems of the prior art, all communications between a PCMCIA card 116 or 118 and a system component, such as the CPU 126 or the graphics controller 134, take place over the host system bus 140. Therefore, if a PCMCIA card 116 or 118 requires communications with the output display used by the system, it is necessary to communicate to the output display over the host system bus 140. This communication over the host system bus 140 occupies the host system bus 140 and slows down communications between other system components. Also, by requiring communications between a PCMCIA card 116 or 118 and the output display to take place over the host system bus 140, the systems of the prior art require the major system components to be active, thereby drawing power from the battery or other power source, even when they may not be required by the system. What is needed is a method to couple a multimedia type PCMCIA peripheral card over a standard PCMCIA interface. What is further needed is a PCMCIA host adapter integrated circuit which will couple a multimedia type PCMCIA peripheral card directly to the graphics controller, thereby bypassing the host system bus and allowing the host system bus to simultaneously be utilized for communications between other system components.

SUMMARY OF THE INVENTION

A computer system including one or more PCMCIA expansion slots allows video and/or audio capabilities to be added to the system through a standard PCMCIA interface, utilizing multimedia type PCMCIA peripheral cards. A PCMCIA host adapter integrated circuit interrogates a PCMCIA peripheral card to determine whether or not the PCMCIA peripheral card is a multimedia type PCMCIA peripheral including video or audio capability. If the PCMCIA peripheral card is a multimedia type peripheral, the PCMCIA host adapter integrated circuit couples the PCMCIA peripheral card directly to the graphics and sound controller integrated circuits, using the standard PCMCIA interface and bypassing the host system bus. Otherwise, if the PCMCIA peripheral card is a standard PCMCIA peripheral, then the PCMCIA host adapter integrated circuit interfaces communications between the PCMCIA peripheral card and the host system bus in a conventional manner. The computer system includes a multi-windowing or display function whereby a typical computer applications program may be operating and displayed in a first window or display while the system simultaneously displays a playback or live video signal from a multimedia type peripheral card in a second window or display.

DETAILED DESCRIPTION OF THE PREFERRED EMBODIMENT

The present invention allows video and audio capability to be added to a host computer system over a standard PCMCIA interface. Utilizing the system of the present invention, a multimedia type PCMCIA peripheral card may be plugged into a standard PCMCIA expansion slot. A multimedia type PCMCIA peripheral card includes video and/or audio capability, such as a television tuner, an NTSC decoder, a VCR controller and the like. The necessary video, audio and control signals are multiplexed onto the PCMCIA bus which couples the PCMCIA socket to the PCMCIA host adapter. The PCMCIA host adapter is modified so that it will directly route the video, audio and control signals directly to the output display, the output audio circuits and the output control circuits, effectively bypassing the host system bus, when a multimedia type PCMCIA card having video or audio capability is plugged into the PCMCIA socket. When a standard PCMCIA card is plugged into the PCMCIA expansion slot, the PCMCIA host adapter of the present invention interfaces between the peripheral and the host system bus in a conventional manner.

Figure 1:
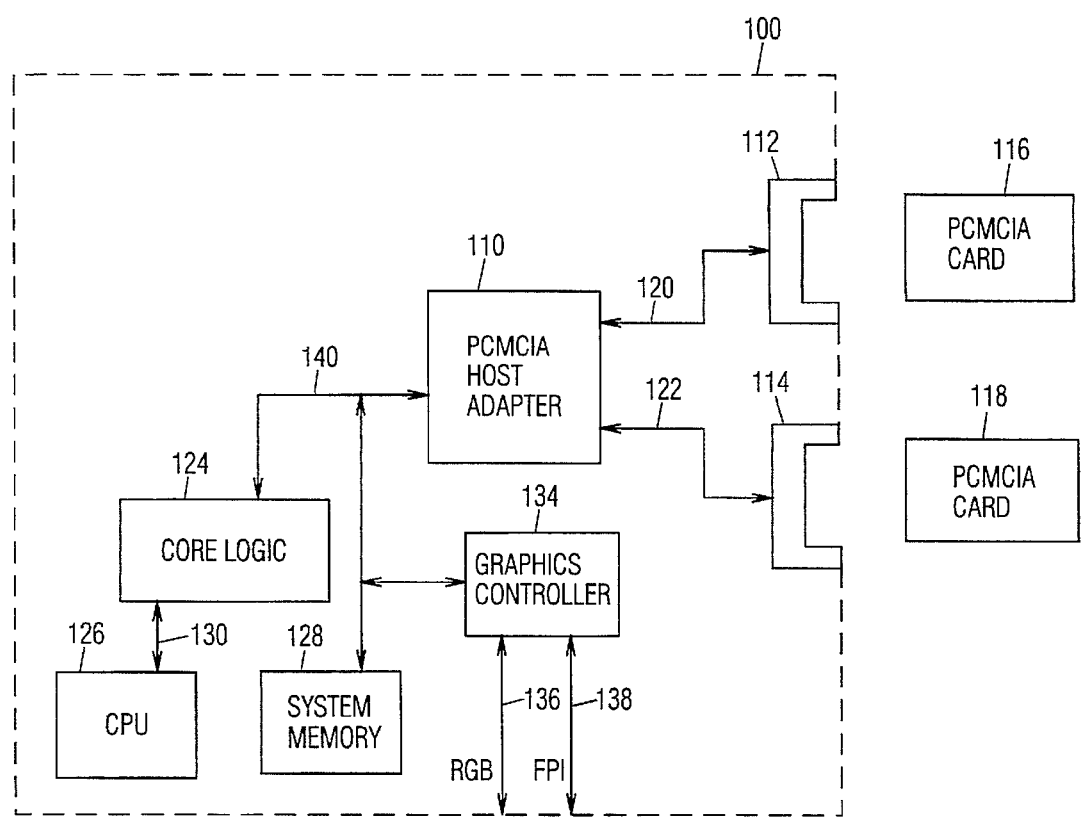
FIG. 1 illustrates a block diagram schematic of a typical computer system of the prior art including PCMCIA capability.
Figure 2:
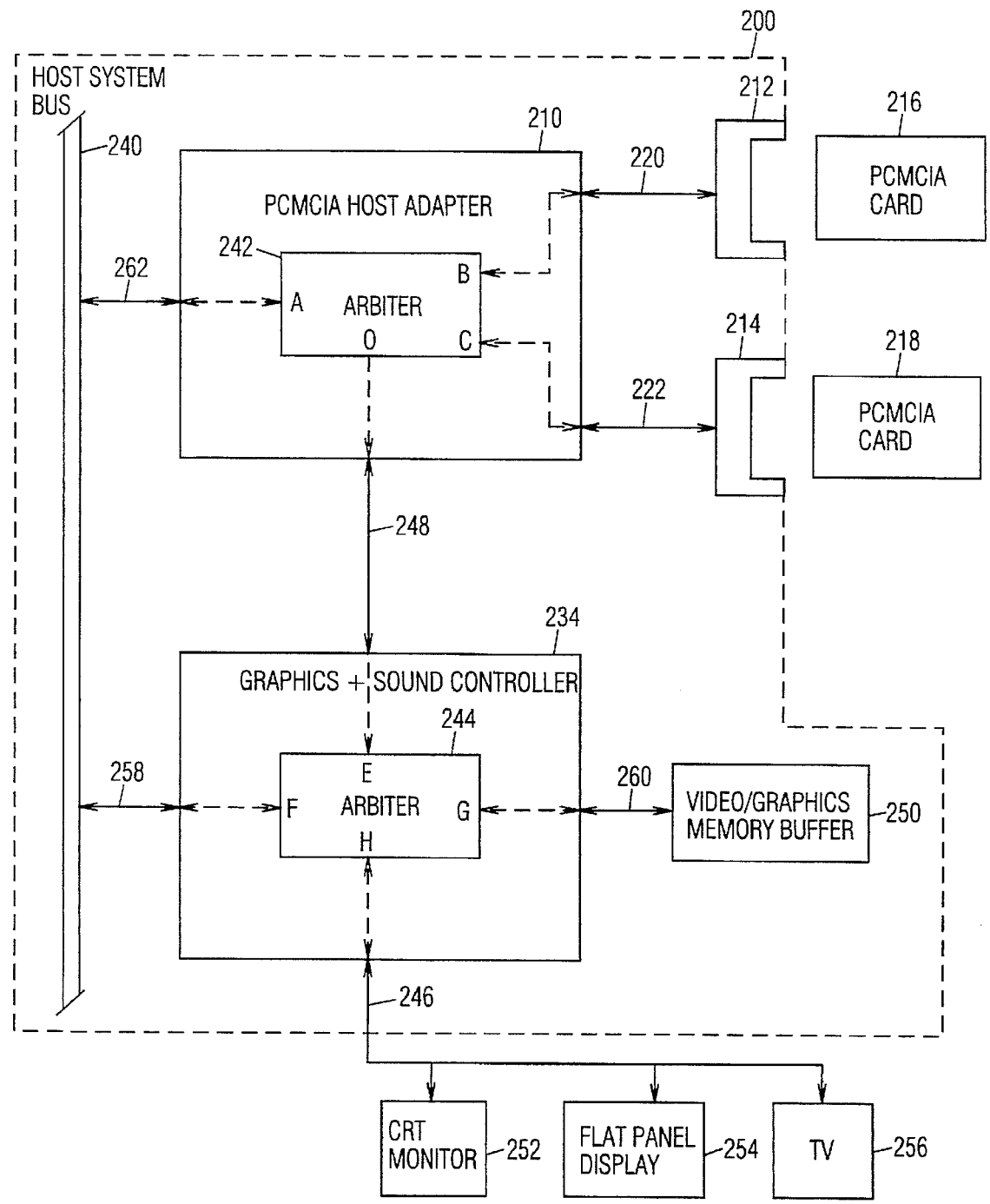
FIG. 2 illustrates a block diagram schematic of the system of the present invention.

A schematic block diagram of the present invention is illustrated in FIG. 2. The motherboard 200 includes a PCMCIA host adapter 210 which is capable of interfacing between the PCMCIA cards 216 and 218 and either the host system bus 240, through the bi-directional connector bus 262, or the graphics and sound controller 234 through the bi-directional connector bus 248, depending on the type of peripheral coupled to the PCMCIA cards 216 and 218. The PCMCIA host adapter 210 is coupled to the PCMCIA expansion slot 212 by the bi-directional PCMCIA bus 220. The PCMCIA host adapter 210 is coupled to the PCMCIA expansion slot 214 by the bi-directional PCMCIA bus 222. Alternatively, a single PCMCIA bus may be used to couple both of the PCMCIA expansion slots 212 and 214 to the PCMCIA host adapter 210. The PCMCIA host adapter 210 is coupled to the host system bus 240 through the bi-directional connector bus 262. The PCMCIA host adapter 210 is also coupled to the graphics and sound controller 234 by the bi-directional connector bus 248. The graphics and sound controller 234 is coupled to the host system bus 240 through the bi-directional connector bus 258. The graphics and sound controller 234 is also coupled to the video/graphics memory buffer 250 through the bi-directional connector bus 260. The graphics and sound controller 234 is further coupled to control at least one output display by the display control bus 246. The output display may be a CRT monitor 252, a flat panel display 254, a television 256 or any other appropriate device which is apparent to one skilled in the art.

When a PCMCIA card 216 is plugged into the PCMCIA expansion slot 212, the PCMCIA host adapter 210 interrogates the PCMCIA card 216 in order to determine what type of peripheral is coupled to the PCMCIA card 216. The interrogation of the PCMCIA card 216 is conducted using existing PCMCIA configuration methods including CPU interrogation of the PCMCIA card information structure and determining the levels present on the card detect and voltage select signal lines, as described in the PCMCIA standard specifications. Once the system has determined what type of peripheral is coupled to the PCMCIA card 216, as long as that PCMCIA card remains plugged into the PCMCIA expansion slot 212, the PCMCIA host adapter 210 will know the format of that peripheral. If the peripheral coupled to the PCMCIA card 216 is a standard PCMCIA peripheral and does not include video or audio capabilities, the PCMCIA host adapter 210 serves as an interface between the peripheral and the host system bus 240 in a conventional manner, thereby interfacing communications between the host system bus 240 and the PCMCIA card 216 using the appropriate transfer rates and data and address line requirements. If the peripheral coupled to the PCMCIA card 216 is a multimedia type PCMCIA peripheral and does include video or audio capabilities, the PCMCIA host adapter 210 routes a selected group of dual purpose signals from the PCMCIA standard interface, directly between the PCMCIA card 216 and the graphics and sound controller 234, thereby bypassing the host system bus 240. When the PCMCIA host adapter 240 serves as an interface between the peripheral coupled to a PCMCIA card 216 or 218 and the host system bus 240, in a conventional manner, the host system bus 240 is also coupled to the graphics and sound controller 234 for outputting data to an output display 252, 254 or 256, as is well known in the art.

The arbiter circuit 242 within the PCMCIA host adapter 210 will be programmed by the CPU after the card information structure has been read and will then direct communications between the peripheral, the host system bus 240 and the graphics and sound controller 234, as required. A detailed schematic of the arbiter circuit 242 of the preferred embodiment is illustrated in FIG. 3.

Figure 3:
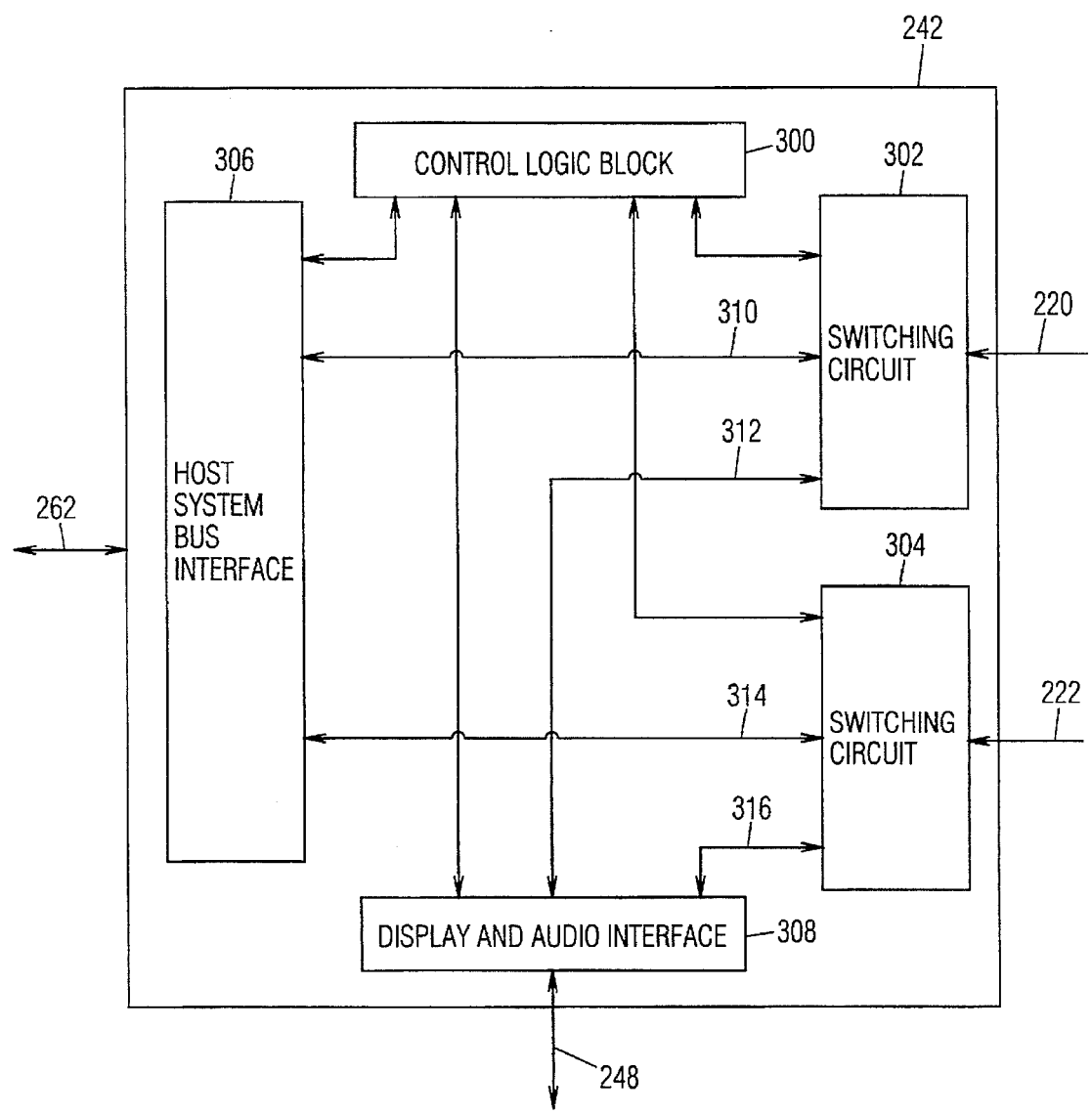
FIG. 3 illustrates a block diagram schematic of the arbiter circuit of the present invention.

In the arbiter circuit, as illustrated in FIG. 3, the PCMCIA bus 220 is coupled to the switching circuit 302. The switching circuit 302 is coupled to the host system bus interface circuit 306 by the bi-directional bus 310 for interfacing between the PCMCIA bus 220 and the host system bus 240 in a conventional manner, when a standard PCMCIA peripheral is coupled to the PCMCIA slot 212. The switching circuit 302 is also coupled directly to the display and audio interface circuit 308 by the bi-directional bus 312 for interfacing directly between the PCMCIA bus 220 and the graphics and sound controller 234 when a multi-media type peripheral is coupled to the PCMCIA slot 212.

The PCMCIA bus 222 is coupled to the switching circuit 304. The switching circuit 304 is coupled to the host system bus interface circuit 306 by the bi-directional bus 314 for interfacing between the PCMCIA bus 222 and the host system bus 240 in a conventional manner, when a standard PCMCIA peripheral is coupled to the PCMCIA slot 214. The switching circuit 304 is also coupled directly to the display and audio interface circuit 308 by the bi-directional bus 316 for interfacing directly between the PCMCIA bus 222 and the graphics and sound controller 234 when a multi-media type peripheral is coupled to the PCMCIA slot 214.

The control logic block 300 is coupled to the switching circuit 302, to the switching circuit 304, to the host system bus interface circuit 306 and to the display and audio interface circuit 308 for interfacing and controlling communications to and from the PCMCIA busses 220 and 222. The host system bus interface circuit is coupled to the host system bus 240 by the bus 262. The display and audio interface circuit is coupled to the graphics and sound controller 234 by the connector bus 248.

The control logic block 300 is responsible for interrogating the PCMCIA cards 216 and 218 when a new PCMCIA card is plugged into the PCMCIA slots 212 and 214 or upon system reset, in order to determine what type of peripheral is coupled to the PCMCIA cards 216 and 218. Once the control logic block 300 has determined what type of peripheral is coupled to the PCMCIA cards 216 and 218, it then determines whether communications to and from the PCMCIA busses 220 and 222 should be directed to the host system bus interface circuit 306 or directly to the display and audio interface circuit 308. If the control logic block 300 determines that the peripheral coupled to the PCMCIA card 216 is a standard peripheral, the control logic block 300 notifies the switching circuit 302 that communications to and from that peripheral should be directed between the PCMCIA bus 220 and the host system bus interface circuit 306. If the control logic block 300 determines that the peripheral coupled to the PCMCIA card 216 is a multimedia type peripheral, including audio or video capabilities, the control logic block notifies the switching circuit 302 that communications to and from that peripheral should be directed between the PCMCIA bus 220 and the display and audio interface circuit 308 directly.

If the control logic block 300 has been programmed to handle the peripheral coupled to the PCMCIA card 218 as a standard peripheral, the control logic block 300 notifies the switching circuit 304 that communications to and from that peripheral should be directed between the PCMCIA bus 222 and the host system bus interface circuit 306. If the control logic block 300 has been programmed to handle the peripheral coupled to the PCMCIA card 216 as a multi-media type peripheral, including audio and/or video capabilities, the control logic block 300 notifies the switching circuit 304 that communications to and from that peripheral should be directed between the PCMCIA bus 222 and the display and audio interface circuit 308 directly.

Figure 4:
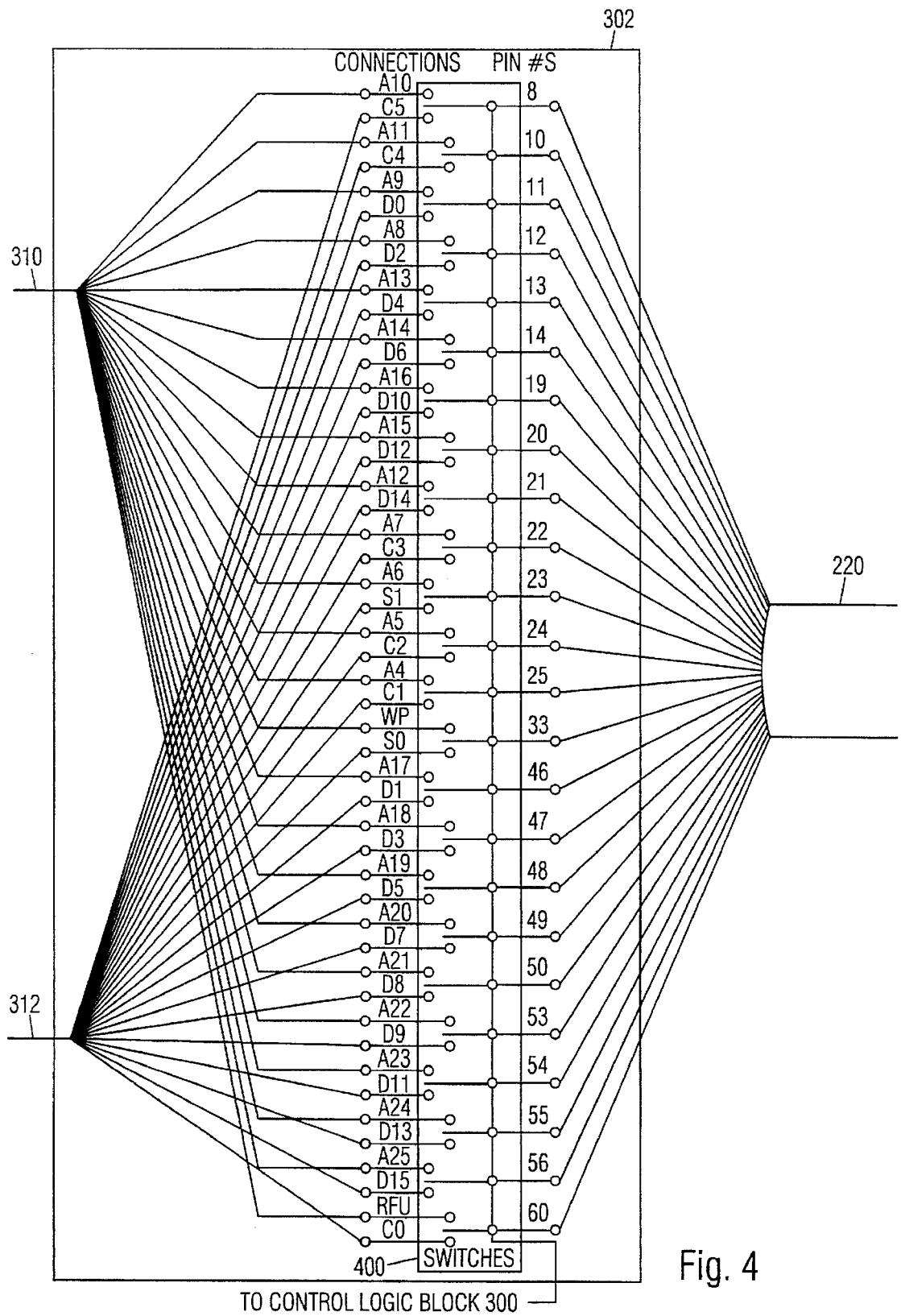
FIG. 4 illustrates a block diagram schematic of the switching circuit of the present invention.

In the preferred embodiment of the present invention, the switching circuit 302 includes input/output analog switches, as illustrated in FIG. 4. The switching circuit 304 is identical to the switching circuit 302 except that it is coupled to the PCMCIA bus 222 and to the bi-directional busses 314 and 316. Alternatively, the switching circuits 302 and 304 may be implemented in any appropriate manner, as will be apparent to those skilled in the art, including a logic gate or combination of gates.

A standard PCMCIA expansion slot, such as the slots 212 and 214, has a total of 68 pins which are each coupled to the PCMCIA bus 220 or 222 and to a PCMCIA card 216 or 218 which is plugged into the slot 212 or 214. The switching circuit 302, as illustrated in FIG. 4, allows 24 of the standard PCMCIA pins to serve a dual purpose, depending on the type of PCMCIA card 216 which is plugged into the PCMCIA slot 212. If the PCMCIA card 216 is a standard PCMCIA card, then the control logic block 300 directs the switching circuit 400 to couple the dual purpose pins to their standard connection on the bus 310 which communicates with the host system bus 240. If the PCMCIA card 216 is a multimedia type PCMCIA card, then the control logic block 300 directs the switching circuit 400 to couple the dual purpose pins to their multimedia connection on the bus 312 which communicates with the graphics and sound controller 234. The remaining pins within the PCMCIA slot 212, which do not serve a dual purpose according to the present invention, are always coupled to the bus 310 for communication with the host system bus 240.

In the switching circuit 302, as illustrated in FIG. 4, the control logic block 300 is coupled to each of the switches within the switching circuit 400 for controlling the operation of each of the switches within the switching circuit 400, simultaneously. Within a standard PCMCIA interface, the pin 8 is coupled to the address line A10. Within the switching circuit 302, the switch coupled to the pin 8 switches between the address line A10 and the multimedia control signal line C5, as directed by the control logic block 300.

Within a standard PCMCIA interface, the pin 10 is coupled to the address line A11. Within the switching circuit 302, the switch coupled to the pin 10 switches between the address line A11 and the multimedia control signal line C4, as directed by the control logic block 300.

Within a standard PCMCIA interface, the pin 11 is coupled to the address line A9. Within the switching circuit 302, the switch coupled to the pin 11 switches between the address line A9 and the video data signal line D0, as directed by the control logic block 300.

Within a standard PCMCIA interface, the pin 12 ms coupled to the address line A8. Within the switching circuit 302, the switch coupled to the pin 12 switches between the address line A8 and the video data signal line D2, as directed by the control logic block 300.

Within a standard PCMCIA interface, the pin 13 ms coupled to the address line A13. Within the switching circuit 302, the switch coupled to the pin 13 switches between the address line A13 and the video data signal line D4, as directed by the control logic block 300.

Within a standard PCMCIA interface, the pin 14 ms coupled to the address line A14. Within the switching circuit 302, the switch coupled to the pin 14 switches between the address line A14 and the video data signal line D6, as directed by the control logic block 300.

Within a standard PCMCIA interface, the pin 19 ms coupled to the address line A16. Within the switching circuit 302, the switch coupled to the pin 19 switches between the address line A16 and the video data signal line D10, as directed by the control logic block 300.

Within a standard PCMCIA interface, the pin 20 ms coupled to the address line A15. Within the switching circuit 302, the switch coupled to the pin 20 switches between the address line A15 and the video data signal line D12, as directed by the control logic block 300.

Within a standard PCMCIA interface, the pin 21 ms coupled to the address line A12. Within the switching circuit 302, the switch coupled to the pin 21 switches between the address line A12 and the video data signal line D14, as directed by the control logic block 300.

Within a standard PCMCIA interface, the pin 22 is coupled to the address line A7. Within the switching circuit 302, the switch coupled to the pin 22 switches between the address line A7 and the multimedia control signal line C3, as directed by the control logic block 300.

Within a standard PCMCIA interface, the pin 23 is coupled to the address line A6. Within the switching circuit 302, the switch coupled to the pin 23 switches between the address line A6 and the audio data signal line S1, as directed by the control logic block 300.

Within a standard PCMCIA interface, the pin 24 is coupled to the address line A5. Within the switching circuit 302, the switch coupled to the pin 24 switches between the address line A5 and the multimedia control signal line C2, as directed by the control logic block 300.

Within a standard PCMCIA interface, the pin 25 is coupled to the address line A4. Within the switching circuit 302, the switch coupled to the pin 25 switches between the address line A4 and the multimedia control signal line C1, as directed by the control logic block 300.

Within a standard PCMCIA interface, the pin 33 is coupled to the write protect signal line WP. Within the switching circuit 302, the switch coupled to the pin 33 switches between the write protect signal line WP and the audio data signal line S0, as directed by the control logic block 300.

Within a standard PCMCIA interface, the pin 46 is coupled to the address line A17. Within the switching circuit 302, the switch coupled to the pin 46 switches between the address line A17 and the video data signal line D1, as directed by the control logic block 300.

Within a standard PCMCIA interface, the pin 47 is coupled to the address line A18. Within the switching circuit 302, the switch coupled to the pin 47 switches between the address line A18 and the video data signal line D3, as directed by the control logic block 300.

Within a standard PCMCIA interface, the pin 48 ms coupled to the address line A19 Within the switching circuit 302, the switch coupled to the pin 48 switches between the address line A19 and the video data signal line D1, as directed by the control logic block 300.

Within a standard PCMCIA interface, the pin 49 is coupled to the address line A20 Within the switching circuit 302, the switch coupled to the pin 49 switches between the address line A20 and the video data signal line D7, as directed by the control logic block 300.

Within a standard PCMCIA interface, the pin 50 is coupled to the address line A21. Within the switching circuit 302, the switch coupled to the pin 50 switches between the address line A21 and the video data signal line D8, as directed by the control logic block 300.

Within a standard PCMCIA interface, the pin 53 is coupled to the address line A22. Within the switching circuit 302, the switch coupled to the pin 53 switches between the address line A22 and the video data signal line D9, as directed by the control logic block 300.

Within a standard PCMCIA interface, the pin 54 ms coupled to the address line A23. Within the switching circuit 302, the switch coupled to the pin 54 switches between the address line A23 and the video data signal line D11, as directed by the control logic block 300.

Within a standard PCMCIA interface, the pin 55 is coupled to the address line A24. Within the switching circuit 302, the switch coupled to the pin 55 switches between the address line A24 and the video data signal line D13, as directed by the control logic block 300.

Within a standard PCMCIA interface, the pin 56 ms coupled to the address line A25 Within the switching circuit 302, the switch coupled to the pin 56 switches between the address line A25 and the video data signal line D15, as directed by the control logic block 300.

Within a standard PCMCIA interface, the pin 60 is coupled to a reserved signal line RFU. Within the switching circuit 302, the switch coupled to the pin 60 switches between the reserved signal line RFU and the multimedia control signal line C0, as directed by the control logic block 300.

Within the switching circuit 302 the address lines A4–A25, the reserved signal line RFU and the write protect signal line WP are all coupled to the bus 310 for communication with the host system bus 240, when directed by the control logic block 300. The multimedia control signal lines C0–C5, the video data signal lines D0–D15 and the audio data signal lines S0 and S1 are all coupled to the bus 312 for communication with the graphics and sound controller 234.

While the switching circuit 304 has not been described in detail, its couplings and operation are identical to that of the switching circuit 302, described above, except that the switching circuit 304 is coupled to the PCMCIA bus 222 for communications with the PCMCIA slot 214, to the bus 314 for communications with the host system bus 240 and to the bus 316 for communications with the graphics and sound controller 234. As will be apparent to those skilled in the art, other than being coupled to the second PCMCIA bus 222 and to the busses 314 and 316, the operation of the switching circuit 304 is identical to that described above for the switching circuit 302. As will be apparent to those skilled in the art, the switches used within the switching circuits 302 and 304 may be of any appropriate design which conforms to the constraints of the particular design environment.

Figure 5:
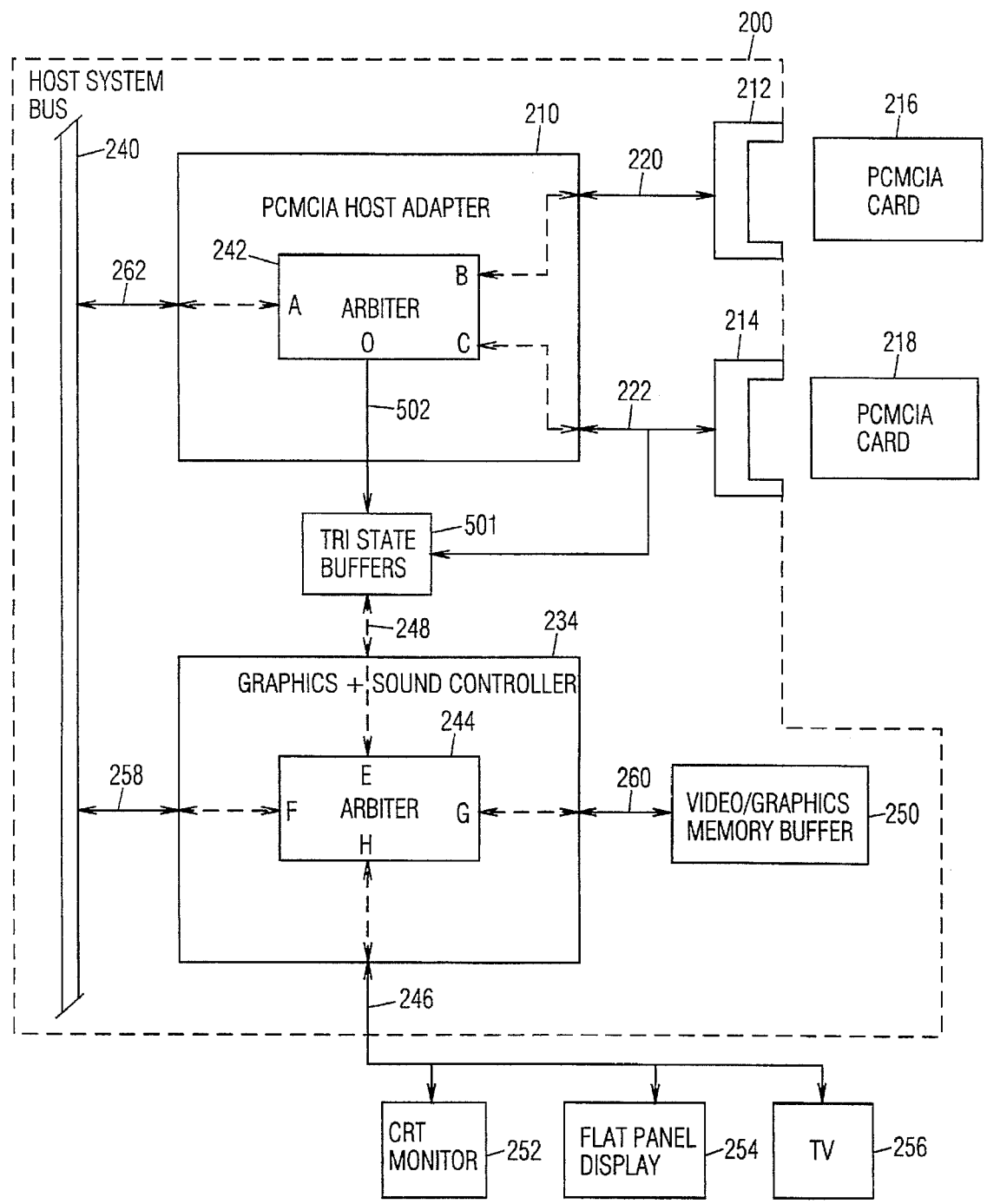
FIG. 5 illustrates a block diagram schematic of an alternate embodiment of the switching circuit.

In an alternate embodiment, the switching circuit 304 is external to the PCMCIA adapter 210, as illustrated in FIG. 5. In this embodiment the PCMCIA card 218, when identified as a multimedia card, is coupled to the PCMCIA bus 222 and thereby coupled to the graphics and sound controller 234 either directly or through the tri-state isolation buffers 501. The tri-state isolation buffers 501 are designed to implement the switching circuit 304 and are controlled either by the arbiter circuit 242 through the logic signal line 502 or an external control circuit through the host system bus 240. When the arbiter circuit 242 is controlling the tri-state buffers 501, the arbiter circuit 242, on command from the CPU over the host system bus 240 and the bi-directional connector bus 262, will control the operation of the tri-state buffers 501 through the logic signal line 502 and thereby facilitate communication directly between the expansion slot 214 and the graphics and sound controller 234. In this embodiment, when a multimedia type PCMCIA card is detected, the PCMCIA host adapter 210, under program control, will place the assigned pins in a high impedance state to facilitate the transfer of multimedia data over the PCMCIA bus 222 to the tri-state isolation buffers 501 and then to the graphics and sound controller 234 or directly to the graphics and sound controller 234. When either of the PCMCIA cards 216 or 218 is communicating with the host system bus, the communications are directed through the arbiter circuit 242, as described above. It should be apparent to those skilled in the art that the PCMCIA slot 212 may also be coupled to an external set of tri-state buffers for direct communication with the graphics and sound controller 234 when a multimedia type PCMCIA card is plugged into the PCMCIA expansion slot 212, in the same manner as illustrated in FIG. 5.

Upon power-on reset or when a new PCMCIA card 216 or 218 is plugged into one of the PCMCIA slots 212 or 214, the PCMCIA host adapter 210 interrogates the PCMCIA cards 216 and 218 in order to determine what type of peripheral is coupled to each of the PCMCIA cards 216 and 218. If the peripheral coupled to the PCMCIA card 216 is a standard PCMCIA peripheral, then the control logic block 300 directs the switching circuit 302 to couple the dual purpose pins coupled within the switching circuit 302 to their standard connections and thereby to the bus 310 for communication with the host system bus 240 through the host system bus interface circuit 306. If the peripheral coupled to the PCMCIA card 216 is a multimedia type PCMCIA peripheral card including video and/or audio capability, then the control logic block 300 directs the switching circuit 302 to couple the dual purpose pins coupled within the switching circuit 302 to their multimedia connections and thereby to the bus 312 for communication with the graphics and sound controller 234, through the display and audio interface circuit 308. Correspondingly, if the PCMCIA card 218 is a standard PCMCIA peripheral card then the control logic block 300 directs the switching circuit 304, to couple the dual purpose pins coupled within the switching circuit 304 to their standard connections and thereby to the bus 314 for communication with the host system bus 240 through the host system bus interface circuit 306. If the PCMCIA card 218 is a multimedia type PCMCIA peripheral card including video and/or audio capability then the control logic block 300 directs the switching circuit 304 to couple the dual purpose pins coupled within the switching circuit 304 to their multimedia connections and thereby to the bus 316 for communication with the graphics and sound controller 234, through the display and audio interface circuit 308.

When more than one PCMCIA peripheral card 216 and 218 is coupled to the system, the control logic block 300 must multiplex and control communications to and from the PCMCIA cards 216 and 218. Within the arbiter circuit 242 of the present invention, the switching circuits 302 and 304 are maintained separately by the control logic block 300 in order to accommodate PCMCIA peripheral cards of differing formats. The PCMCIA card 216 may be a standard format PCMCIA peripheral card and require communications with the host system bus 240 while the PCMCIA card 218 may be a multimedia type PCMCIA peripheral card and require communications with the graphics and sound controller 234 directly, or vice versa. The control logic block 300 must control these communications and route them accordingly.

The host system bus interface circuit 306 is controlled by the control logic block 300. The control logic block 300 will notify the host system bus interface circuit 306 which one of the PCMCIA peripheral cards desires communications with the host system bus 240. In response, the host system bus interface circuit 306 will couple the appropriate bi-directional bus 310 or 314 to the host system bus 240, through the connector bus 262, in a conventional manner. The display and audio interface circuit 308 is controlled by the control logic block 300. The control logic block 300 will notify the display and audio interface circuit 308 which one of the PCMCIA peripheral cards desires communications with the host system bus 240. In response, the display and audio interface circuit 308 will couple the appropriate bi-directional bus 312 or 316 to the graphics and sound controller 234, through the connector bus 248.

When a multimedia type PCMCIA peripheral is coupled to the system through a PCMCIA expansion slot 212 or 214, the PCMCIA host adapter circuit 210 of the present invention couples video data signals, audio data signals and control data signals directly from the PCMCIA bus 220 or 222 to the graphics and sound controller 234, over a standard PCMCIA interface, effectively bypassing the host system bus 240. By using a PCMCIA card 216 or 218 to add video and/or audio capabilities, this method does not require the addition of any planar logic on the motherboard 200. The system of the present invention also does not rely on the host system bus bandwidth capabilities to ensure high quality live video capability on the output display 252, 254 or 256. Using this method and bypassing the system bus allows a system to decrease system bus activity while displaying full screen live video, thereby greatly reducing the system power requirements. For a portable computer system, this will mean longer battery life.

This method of the present invention will allow a portable computer to function as a television either while a user simultaneously works on an application or with most of the system in a stand-by mode. If the user is not simultaneously working on an application while the system is displaying video, the only major subsystems which will require full operational power are the PCMCIA host adapter 210, the PCMCIA multimedia peripheral coupled to the PCMCIA card 216 or 218, the graphics and sound controller 234 and the appropriate output display 252, 254 or 256.

The host system bus 240 is also coupled directly to the graphics and sound controller circuit 234 for communicating to the system output display 252, 254 or 256. If the system output display 252, 254 or 256 is capable, and the user so desires, the graphics and sound controller circuit 234 of the present invention will direct the system output display 252, 254 or 256 to display two windows on the display screen, if a multimedia type PCMCIA peripheral is coupled to the system. Alternatively, two separate output displays 252, 254 or 256 may be utilized. In either of these ways, a user may utilize the typical computer functions of the system in the window or display driven by the host system bus 240 while simultaneously utilizing other multimedia type functions in the window or display controlled by the multimedia type PCMCIA card. The system of the present invention will therefore allow a user to work on a typical computer application such as word-processing, spreadsheet, data base, or the like, while at the same time watching a television show or video feed and listening to the accompanying audio signal. In this manner a user may conduct a video teleconference with a person at another location, whereby the two persons may communicate electronically and simultaneously edit a computer file, such as a word-processing document, while at the same time communicating over a shared live video and audio feed.

A system of the present invention including two PCMCIA expansion slots 212 and 214, may incorporate two multimedia type peripherals, two standard PCMCIA peripherals or one multimedia type peripheral and one standard PCMCIA peripheral. In this manner, a user is allowed maximum flexibility to configure the system as desired. In any configuration, the PCMCIA host adapter 210 will selectively couple the PCMCIA busses 220 and 222 to either the host system bus 240 or the graphics and sound controller 234, as appropriate.

The present invention has been described in terms of specific embodiments incorporating details to facilitate the understanding of the principles of construction and operation of the invention. Such references herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A host adapter logic circuit for use within a computer system having a host system bus and an output device, for controlling operation of a communication interface to a peripheral coupled to the computer system through a PCMCIA expansion slot and for interfacing communications between the peripheral and the computer system, the host adapter logic circuit comprising:

a detecting circuit coupled to communicate with the peripheral for determining under which one of a standard format and a multimedia type format the peripheral operates;

a host system bus interfacing circuit coupled to the detecting circuit and coupled for communicating with the peripheral and the host system bus for controlling and directing communications between the peripheral and the computer system, over the host system bus, if the peripheral is a standard peripheral;

a display and audio interfacing circuit coupled to the detecting circuit and coupled for communicating with the peripheral and the output device for controlling and directing communications between the peripheral and the output device directly, thereby bypassing the host system bus, if the peripheral is a multimedia type peripheral; and a switching circuit coupled to the detecting circuit, to the host system bus interfacing circuit, to the display and audio interfacing circuit, and to a plurality of dual-purpose pins within the PCMCIA expansion slot for coupling the dual-purpose pins to either the host system bus interfacing circuit if the peripheral is a standard peripheral or the display and audio interfacing circuit if the peripheral is a multimedia type peripheral.

2. The host adapter logic circuit as claimed in claim 1 wherein the output device includes both video and audio outputs.

3. The host adapter logic circuit as claimed in claim 2 wherein the output device is a CRT monitor.

4. The host adapter logic circuit as claimed in claim 2 wherein the output device is a flat panel display.

5. The host adapter logic circuit as claimed in claim 2 wherein the output device is a television.

6. An interface apparatus within a computer system for interfacing and controlling operation of an interface to a PCMCIA peripheral coupled to a PCMCIA expansion slot and interfacing communications between the PCMCIA peripheral and the computer system, the interface apparatus comprising:

a PCMCIA expansion slot for coupling a PCMCIA card to the computer system over a PCMCIA bus;

an output and display control circuit coupled to a host system bus for controlling display of video and text and output of audio for the computer system; and a host adapter logic circuit coupled to the host system bus, to the output and display control circuit, and to the PCMCIA slot for controlling and interfacing communications between the peripheral and the computer system, the host adapter logic circuit including:

a detecting circuit coupled to the PCMCIA slot for determining under which one of a standard format and a multimedia type format the peripheral coupled to the PCMCIA slot through the PCMCIA card operates;

a host system bus interfacing circuit coupled to the detecting circuit, to the PCMCIA slot, and to the host system bus for controlling and directing communications between the PCMCIA slot and the computer system, over the host system bus, if the peripheral coupled to the PCMCIA slot is of the standard format; and a display and audio interfacing circuit coupled to the detecting circuit, to the PCMCIA slot, and to the output and display control circuit for controlling and directing communications between the PCMCIA slot and the output and display circuit directly, thereby bypassing the host system bus, if the peripheral coupled to the PCMCIA slot is of the multimedia type format; and a switching circuit coupled to the detecting circuit, to the host system bus interfacing circuit, to the display and audio interfacing circuit, and to a plurality of dual-purpose pins within the PCMCIA expansion slot for coupling the dual-purpose pins to either the host system bus interfacing circuit if the peripheral is a standard peripheral or the display and audio interfacing circuit if the peripheral is a multimedia type peripheral.

7. The interface apparatus as claimed in claim 6 further comprising an output display coupled to the output and display control circuit for displaying video and text and outputting audio.

8. The interface apparatus as claimed in claim 7 wherein the output display is a CRT monitor.

9. The interface apparatus as claimed in claim 7 wherein the output display is a flat panel display.

10. The interface apparatus as claimed in claim 7 wherein the output display is a television.

11. A computer system apparatus for interfacing and controlling operation of an interface to PCMCIA peripheral coupled to a PCMCIA expansion slot under control of a microprocessor control circuit, the apparatus comprising:

a microprocessor control circuit for controlling operation of the computer system apparatus;

a host system bus coupled to the microprocessor control circuit;

a PCMCIA expansion slot for coupling a PCMCIA peripheral to the computer system over a peripheral bus;

an output and display control circuit coupled to the host system bus for controlling display of video and text and output of audio for the computer system; and a host adapter logic circuit coupled to the host system bus, to the output and display control circuit, and to the PCMCIA expansion slot for controlling and interfacing communications between the PCMCIA peripheral, the computer system and the output and display control circuit, the host adapter logic circuit including:

a detecting circuit coupled to the expansion slot for determining under which one of a standard format and a multimedia type format the PCMCIA peripheral coupled to the PCMCIA expansion slot operates and transmitting a format status to the microprocessor control circuit over the host system bus;

a host system bus interfacing circuit coupled to the PCMCIA expansion slot and to the host system bus for controlling and directing communications between the PCMCIA expansion slot and the computer system, over the host system bus, if the PCMCIA peripheral coupled to the PCMCIA expansion slot is of the standard format;

a display and audio interfacing circuit coupled to the PCMCIA expansion slot and to the output and display control circuit for controlling and directing communications between the PCMCIA expansion slot and the output and display circuit directly, thereby bypassing the host system bus, if the PCMCIA peripheral coupled to the PCMCIA expansion slot is of the multimedia type format; and a switching circuit coupled to the detecting circuit, to the host system bus interfacing circuit, to the display and audio interfacing circuit, and to a plurality of tri-statable dual-purpose pins within the PCMCIA expansion slot for coupling the dual-purpose pins to either the host system bus interfacing circuit if the PCMCIA peripheral is a standard peripheral or the, display and audio interfacing circuit if the PCMCIA peripheral is a multimedia type peripheral.

12. The computer system apparatus as claimed in claim 11 wherein the switching circuit is controlled by the microprocessor control circuit.

13. The computer system apparatus as claimed in claim 11 further comprising an output display coupled to the output and display control circuit for displaying video and text and outputting audio.

14. A method of controlling operation of a communication interface to a peripheral coupled through a PCMCIA expansion slot to a computer system having a host system bus and an output device and interfacing communications between the peripheral and the computer system comprising the steps of:

determining with a detecting circuit under which one of a standard format and a multimedia type format the peripheral operates;

interfacing, using a host system bus interface, and controlling, using a switching circuit, communications between the peripheral and the computer system, over the host system bus, if the peripheral is of the standard format; and interfacing, using a display and audio interfacing circuit, and controlling, using the switching circuit, communications between the peripheral and the output device directly, thereby bypassing the host system bus, if the peripheral is a multimedia type, peripheral.

15. The method as claimed in claim 14 wherein the output device includes both video and audio output.

* * * * *